United States Patent Office 2,723,261
Patented Nov. 8, 1955

2,723,261

HIGH-MELTING POLYMERS OF PARA-TERT-BUTYLSTYRENE

Irving E. Levine, Albany, Calif., and William E. Elwell, Scarsdale, N. Y., assignors to California Research Corporation, San Francisco, Calif., a corporation of Delaware No Drawing. Application December 22, 1951, Serial No. 263,022

4 Claims. (Cl. 260—88.1)

The invention hereinafter described and claimed relates to thermoplastic polymers of vinyl aromatic hydrocarbons. More particularly, it relates to thermoplastic polymers of an alkyl-substituted styrene in which the alkyl group is a tertiary butyl group in the position para to the vinyl group on the benzene nucleus.

It is a particular object of the present invention to provide a new thermoplastic polymeric material possessing valuable and unique properties and, in particular, having a superior heat resistance which renders this material suitable for a variety of industrial applications wherein other thermoplastic materials, such as polystyrene and polymers of other substituted styrenes, cannot be used on account of their relatively poor heat resistance.

Resistance to heat, that is, ability to withstand high temperatures without suffering distortion of form and structure, is one property which controls the usefulness of a thermoplastic. Softening point values are employed in the art to define the highest practical service temperature of a plastic body when no stress in involved. When a plastic material is subjected to the effect of high temperatures while being under the influence of some stress or load, the maximum serviceable temperature is indicated by the value of the so-called heat distortion point, which is the lowest temperature at which a particular plastic material yields a specified distance under a given load. As a general rule, relatively low heat distortion point values of the order of from 60 to 95° C. are displayed by thermoplastic materials as contrasted with the thermosetting ones. This fact limits the application of most thermoplastic materials in those uses were temperatures above 100° C. are encountered either intermittently or continuously, for instance, in those cases where the material is to be exposed to contact with boiling water.

Polystyrene, a thermoplastic material, is known to be eminently suitable for the production of various molded articles and, owing to its extremely low power factor and other excellent electrical properties, it is widely used in the electronic art, especially in the field of radio and radar equipment. However, in many operations of electronic tubes, batteries and resistance coils, considerable heat is produced, and the concomitant high temperature affects adversely the parts molded of polystyrene, especially when these parts are subjected to any amount of loading or stress (e. g., internal stress in injection moldings). Therefore, in spite of its excellent electrical properties, the applications of polystyrene in the electronic art are of necessity limited to relatively low temperature conditions, since the average maximum temperature at which molded styrene retains its strength lies in the vicinity of 75–80° C. and cannot, as a rule, exceed about 90–95° C., even in those moldings which are of a higher molecular weight (of the order of 80,000).

The use of polystyrene in the manufacture of various household articles of kitchen and table ware by injection, extrusion, or compression molding methods appears to be highly attractive. However, because of the aforementioned tendency of polystyrene to suffer distortion when exposed to high temperatures, its application is often precluded, particularly where the articles manufactured therefrom are to be employed in contact with hot water, in other words, at temperatures from about 90 to 100° C.

We have now found that by polymerizing para-tert-butylstyrene a thermoplastic material is produced which has heat distortion temperatures in the range from about 120° C. to 130° C., and in any event well above the boiling point of water. Consequently, this polymeric material, which has an average molecular weight from about 40,000 to 60,000 and higher, can be readily molded into various shapes and forms and can be employed in a variety of applications where polystyrene has heretofore been considered inadequate owing in its low heat distortion temperatures. At the same time the polymers of para-tert-butylstyrene have a density much lower than that of similar polystyrene, while their other properties, such as tensile strength, impact resistance, abrasion resistance, chemical resistance, water absorption, etc., resemble those of polystyrene.

The following illustrative examples will aid in elucidating the principles of our invention, although it is to be understood that these examples in no way restrict the scope of the invention.

EXAMPLE 1

*Preparation of monomer*

Monomeric para-tert-butylstyrene was prepared by acetylating about 1.50 mols of tert-butylbenzene with 1.65 mols of acetyl chloride (10% molar excess) in the presence of 1.57 mols of aluminum chloride (5% molar excess) in carbon disulfide. The reaction equipment consisted of a round-bottomed flask provided with a paddle stirrer, a dropping funnel, a thermometer, a condenser for the off-gases, and a caustic scrubber. The reactions were added through the funnel at a rate sufficient to maintain the pot temperature in the flask between 0° and 5° C. After having been stirred for about 3 hours at a temperature of about 25° C., the reaction mixture was poured into a mixture of ice and hydrochloric acid and then extracted with ether. This extract was dried, the ether was evaporated off, and the residue was distilled at 20 mm. of Hg., yielding 79.2 mol per cent of para-tert-butylacetophenone. Thereupon, the butylacetophenone (1.00 mol) was heated with aluminum isopropoxide (1.00 mol) in a solution of isopropanol, employing for this reaction a round-bottomed flask provided with a thermometer and an 18-inch helix-packed column and removing the acetone in such a way as to keep the overhead temperature at about 70° C. When no more acetone came off, isopropanol was carefully distilled off.

The residue was then acidified and extracted with benzene, whereupon the extract was stripped of benzene. The material recovered by this purification technique was dehydrated by distilling it from acid potassium sulfate. When the crude dehydration product was subjected to purification by distillation, a distillate boiling about 100° C. above the boiling point of the expected para-tert-butylstyrene was obtained. It had a molecular weight of 325 and was found to be an ether, namely, bis-[α-(para-tert-butylphenyl)-ethyl] ether of the structure:

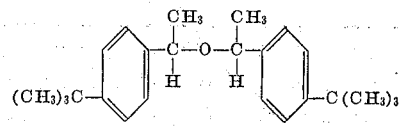

This ether can be cracked by heating it and yields then the monomeric para-tert-butylstyrene.

In order to avoid the formation of this ether intermediate, the crude reduction mixture was dehydrated without purification. In this case, no substantial formation of an ether occurred, and the tert-butylphenyl methyl carbinol from the reduction of tert-butylacetophenone could be readily dehydrated furnishing water and para-tert-butylstyrene by distillation in the presence of about 1% of fused potassium acid sulfate, 1% hydroquinone and 0.5% of para-tert-butylcatechol (these two latter having been added as polymerization inhibitors). After this distillation at 100 mm. pressure, an ether solution of the distillate was washed with sodium hydroxide, dried and redistilled in a Vigreux column at 10 mm. pressure. The ultimate para-tert-butylstyrene product was obtained in a yield equal to 59 mol per cent, based on para-tert-butylacetophenone, or 43 mol per cent, based on the initial tert-butylbenzene.

Preparation of polymer

The aforedescribed para-tert-butylstyrene monomer was heated in a test tube with about 0.1% by weight of benzoyl peroxide for a period of 21 hours and 15 minutes at 70° C. and then for an additional 9 hours at about 90° C. After stripping off the excess of the monomer by a quick heating under vacuum in a conventional manner, the remaining copolymer was dissolved in benzene and precipitated with methanol. After this procedure was repeated three times, the final product was washed with methanol, dried and ground to a fine white powder. The ultimate yield based on the initial monomer amounted to 61 mol per cent.

EXAMPLE 2

Preparation of monomer

In this case, we prepared the monomer by acetylating tert-butylbenzene with acetyl chloride in the presence of aluminum chloride catalyst in solution in carbon disulfide in the same manner and under identical conditions as described hereinbefore in Example 1. Para-tert-butylacetophenone was purified by fractional crystallization to remove meta-tert-butylacetophenone. In order to carry out the reduction of purified ketone, we treated an amount equal to 1.6 mols thereof with 0.39 mol of lithium aluminum hydride dissolved in 500 ml. of absolute ether. The crude yield of para-tert-butylphenyl methyl carbinol was higher than 99% by weight. Instead of resorting to the distillation technique of the preceding example and in order to minimize the formation of ethers, the carbinol was recrystallized from mixed hexanes at a temperature of less than about 60° C. The final yield was equal to 88.4 mol per cent of pure solid carbinol, based on the acetophenone. After dehydration, which was carried out in the same way as in the preceding example, pure para-tert-butylstyrene was recovered in a yield of 76.5 mol per cent.

Preparation of polymer

In this example we employed a different, preferred polymerization technique. The monomer was redistilled just prior to the polymerization, taking care that no stopcock lubricant contaminated it. About 5 ml. of the monomer was then placed in a 10 ml. vial which was plunged into a bath of Dry Ice and acetone and was immediately evacuated to about 2 mm. Hg. The monomer became solidified and nitrogen was admitted into the vial. The evacuation and admission of nitrogen were repeated four more times to insure a complete removal of all traces of oxygen. The vial was then sealed while under vacuum and placed in an oven, where it was heated at 90° C. for 24 hours, at 120° C. for 7 hours, at 170° C. for 7 more hours, and finally at 210° C. for the last 7 hours.

The monomeric para-tert-butylstyrene is readily copolymerizable with vinyl type monomers in general. Typical example of such a copolymer is one produced by us by reacting monomeric para-tert-butylstyrene and monomeric meta-tert-butylstyrene in a weight ratio of from about 95 to about 50% of para-monomer to from about 5 to about 50% of meta-monomer, employing the polymerization techniques of Examples 1 and 2 hereinabove. Another example is the product of a similar copolymerization of monomeric para-tert-butylstyrene and monomeric styrene employed in a weight ratio similar to that given hereinabove for the preparation of the copolymer of para-tert-butylstyrene and meta-tert-butylstyrene. The resulting copolymer possessed properties intermediate to those of polystyrene and para-tert-butylstyrene.

Properties of polymer

A number of properties of our polymer were determined, among them the solubility in methanol which indicates the extent of polymerization, the viscosity in a dilute solution of toluene which enables the calculation of the molecular weight, the A. S. T. M. specific gravity (23/23° C.), the heat distortion points for different fiber stresses, and the Sward hardness. The melting point was determined by noting the temperature at which birefringence was no longer visible under a microscope. We also determined the heat distortion temperatures in accordance with the A. S. T. M. specification D648–45T, for fiber stresses of 66 and 264 p. s. i. applied in a molded bar of ½" x ½" x 5". It was noted that our polymer of para-tert-butylstyrene did not become distorted in any manner when exposed to contact with boiling water. The temperature at which our polymer became sticky was also determined by stroking a sample of the polymer with a spatula on a gradually heated hot plate. It was given an arbitrary designation of "stick temperature."

The data from the aforementioned determinations are tabulated in the following Table I together with the data on the properties of various commercially available polystyrenes, of a polystyrene prepared in our laboratory, of a copolymer of styrene and para-tert-butylstyrene, and figures specified by the A. S. T. M. in the specification D703–49T for a high heat distortion polystyrene, type 3. The comparison of these data unambiguously shows the advantages of our polymers of para-tert-butylstyrene.

*Table I*

| Polymeric material | Solubility in methanol in percent | Stick Temp., °C. | Viscosity in a 10% solution of toluene in centipoises | Melt. Pt., °C. | Specific gravity (ASTM 23/23° C.) | Molecular Weight | Heat distortion point in °C. At fiber stress | | Sward hardness (glass =100) |
|---|---|---|---|---|---|---|---|---|---|
| | | | | | | | at 66 p. s. i. | at 264 p. s. i. | |
| Polymer of para-tert-butylstyrene (Example 1). | 2.52 | | 21.8 | | 0.954 | 61,000 | | | 83 |
| Polymer of para-tert-butylstyrene (Example 2). | | 150 | | 176–177 | 0.953 | 42,000 | 127 | 121 | |
| Copolymer of styrene and para-tert-butylstyrene (50:50 wt. ratio). | 2.22 | | | | | 55,000 | | | |
| Polystyrene prepared in our laboratory | 2.73 | 117 | | 117 | 1.056 | 58,500 | 95 | 90 | 73 |
| ASTM–D703–49T specification for high heat distortion polystyrene, Type 3. | 3.5 (max.) | | | 20 (min.) | 1.045–1.07 | | | | |
| Commercial polystyrene | 2.45 | | | | 1.133 | | 93 | 89 | 60 |
| Commercial high distortion polystyrene | | | | | | 60,000–80,000 | | 84–88 | |

The unusually high values of distortion temperatures of our para-tert-butylstyrene polymers, which are at least 25 to 30° C. higher than the heat distortion temperatures of polystyrene, are entirely unexpected when one considers that polymers of isomeric meta-tert-butylstyrene prepared by the procedure shown by Marvel and coworkers on pages 1088–1091 of the Journal of American Chemical Society for June 1946, have heat distortion points similar to those of polystyrene. This unexpected ability of our polymers to withstand exposure to much higher temperatures than those causing distortion in polystyrene makes them extremely valuable as superior and efficient substitutes for polystyrene in a number of industrial applications. In extrusion molding, the lower specific gravity of our polymers of para-tert-butylstyrene permits of securing a greater volume of goods per pound of the original material as compared with polystyrene and other similar materials. Finally, the polymers of our invention are harder than the conventional polystyrene, which fact is a definite advantage in certain industrial applications.

Another procedure for the preparation of para-tert-butylstyrene monomer suitable for conversion to heat resistant high-melting polymers of our invention, involves alkylating ethylbenzene with isobutene in the presence of a catalyst such as hydrofluoric acid at temperatures from about 0 to about 10° C. The alkylate is washed first with caustic and then with water, and, after being dried and filtered, is distilled to yield para-tert-butylethylbenzene. This latter can then be dehydrogenated in the presence of a suitable catalyst at reduced pressure and suitable temperature of the order of 600° C. to yield para-tert-butylstyrene monomer, which, upon purification, can be readily converted to the high-melting polymer.

Another convenient procedure for the preparation of monomeric para-tert-butylstyrene consists in oxidizing para-tert-butylethylbenzene to para-tert-butylacetophenone. In a typical example 156 g. of para-tert-butylethylbenzene was oxidized with air oxygen in the presence of a cobalt catalyst, yielding 95.9 g. of a crude product which consisted of a mixture of para-tert-butylacetophenone and para-tert-butylphenyl methyl carbinol in a weight ratio of 92:8. The ketone in the ketone-carbinol mixture can be readily reduced to give only the carbinol, without resorting to any special separation of the butyl acetophenone from the carbinol. Upon this reduction, the carbinol product can be dehydrated and converted to a high-melting polymer of para-tert-butylstyrene in accordance with the procedures described hereinbefore in this specification.

At this point we wish to observe that the conversion of monomeric para-tert-butylstyrene to the high melting polymeric material of our invention is by no means limited to the representative examples hereinabove of bulk polymerization whether thermally or with peroxide catalysts, but may be also performed by employing ultraviolet light to catalyze the polymerization, or yet may be carried out by emulsion or suspension polymerization techniques in the presence of a suitable effective emulsifier or dispersant. The monomer for this type of polymerization is preferably stabilized while in storage by introducing a small amount of a polymerization inhibitor such as hydroquinone, which can be removed in a conventional manner prior to the polymerization treatment, thus obviating the employment of relatively large amounts of a polymerization catalyst. Of course, where retarders of polymerization which decompose upon heating are present in the monomer as stabilization aids, these retarders need not be removed before the polymerization treatment.

Solubilities of our polymers in aromatic hydrocarbon solvents, chlorinated hydrocarbon solvents and organic ester solvents are similar to those of polystyrene.

The polymers of para-tert-butylstyrene described in this application are especially suitable for use in the manufacture of various articles molded by injection, extrusion or compression techniques, particularly when materials of good electrical properties, high temperature stability and tensile strength are desired. These polymeric materials are clear and transparent in appearance, but, if desired, may be combined with dyes, pigments, fillers, etc. Furthermore, the polymers of our invention may be employed in compounding a variety of coating compositions, such as paints, enamels, varnishes, lacquers, and the like, in which cases other resins and plasticizers compatible with these polymers can be employed in admixture therewith. Interpolymers of polymers of para-tert-butylstyrene and polymers of vinyl-type compounds can also be prepared by molding together the corresponding homopolymers. These interpolymer materials are characterized by higher distortion temperatures owing to the presence therein of the para-tert-butylstyrene polymeric component.

Aqueous emulsions or solutions in organic solvents of our polymers are suitable for coating and impregnating treatments of fibrous materials such as paper, textiles, leather, etc. and render these materials moisture- and vapor-proof.

It is to be understood that the invention as described by us hereinbefore is not limited to the particular details of the aforegiven description and representative examples, but includes any variation or modification thereof, without departing from the scope of the invention as defined in the annexed claims.

We claim:

1. As a new thermoplastic material, polymeric para-tert-butylstyrene having an average molecular weight of about 50,000 and characterized by heat distortion temperatures in the range from 120 to 130° C.

2. As a new thermoplastic material, polymeric para-tert-butylstyrene having an average molecular weight of about 50,000 and characterized by heat distortion temperatures which are at least 25 to 30° C. higher than the heat distorting temperatures of polystyrene of comparable average molecular weight.

3. As a new thermoplastic material, a copolymer of monomeric styrene and monomeric para-tert-butylstyrene, said copolymer having an average molecular weight of about 50,000 and being prepared by reacting monomeric para-tert-butylstyrene and monomeric styrene in a weight ratio of from about 95 to about 50% of the butylstyrene monomer to from about 5 to about 50% of the styrene monomer.

4. As a new thermoplastic material, polymeric para-tert-butylstyrene having an average molecular weight from about 40,000 to about 60,000 and characterized by heat distortion temperatures in the range from 120 to 130° C.

References Cited in the file of this patent

Marvel et al.: J. Am. Chem. Soc., 68, pages 1088–1091 (June 1946).

Mowry et al.: J. Am. Chem. Soc., 68, 1105–9 (1946).